No. 891,465. PATENTED JUNE 23, 1908.
W. COX.
ANTIRATTLER THILL COUPLING AND SUPPORT.
APPLICATION FILED MAY 28, 1907. RENEWED APR. 28, 1908.
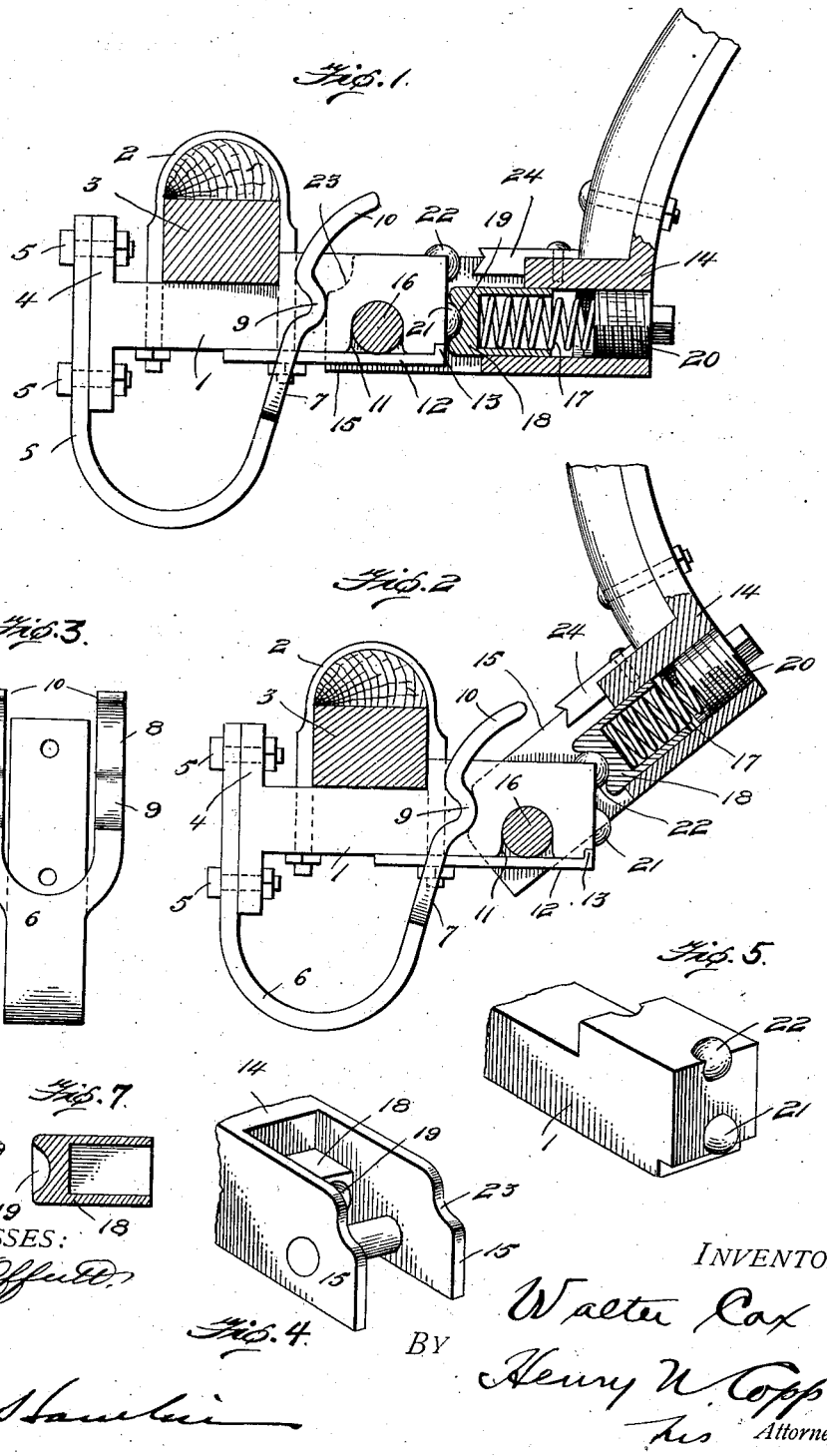
WITNESSES:
INVENTOR
Walter Cox
BY Henry N. Copp
his Attorney

UNITED STATES PATENT OFFICE.

WALTER COX, OF PROVO, UTAH.

ANTIRATTLER THILL COUPLING AND SUPPORT.

No. 891,465.  Specification of Letters Patent.  Patented June 23, 1908.

Application filed May 28, 1907, Serial No. 376,160. Renewed April 28, 1908. Serial No. 429,622.

*To all whom it may concern:*

Be it known that I, WALTER COX, a citizen of the United States, residing at Provo city, county of Utah, and State of Utah, have invented certain new and useful Improvements in Antirattler Thill Couplings and Supports, of which the following is a specification.

This invention relates to anti-rattler thill couplings and supports.

The object of the present invention is the provision of a thill coupling having novel means for locking the thill in both lowered and raised positions, embracing means preventing rattling by taking up lost motion.

The invention contemplates the provision of a device of the character set forth, wherein the parts may be readily assembled or detached and the tension of the spring-actuated retaining or locking means regulated.

The invention is set forth fully hereinafter and its novel features are recited in the appended claims.

In the accompanying drawings: Figure 1 is a side view, partly in section, showing the parts in normal position; Fig. 2, a similar view with the thill raised; Fig. 3 is a front detail of the leaf spring; Fig. 4, a detail perspective of the movable coupling member; Fig. 5, a detail perspective of the stationary coupling member; and Figs. 6 and 7, details of the plunger.

The numeral 1 designates one of the coupling members, the same being held by an ordinary U-shaped clevis or yoke 2 securing it to the axle 3 and it is provided at its rear end with a head 4 to which is connected by bolts 5, a strong leaf-spring 6 having spring fingers 7 and 8 which straddle the member 1 and are provided with humps or shoulders 9 and curved extremities 10.

Leading upwardly from the lower surface of the forward part or head of the member 1, is a notch or entrance mouth 11, which is closed by a removable plate 12 held by one of the legs of yoke 2 and provided with an up-turned end 13 entering a notch in the coupling member 1.

The other coupling member 14, to which the thill is secured, has a fork composed of the side-pieces 15, which straddle the outer end of the head of coupling member 1 and are bridged by a bolt or pin 16, which is received in the notch or entrance mouth 11 and held in place by the plate 12. The coupling member 14 has a chamber in which is a coil spring 17, which presses against a plunger 18 having a concavity 19, and the tension on the spring is regulated by a screw 20. On the head of coupling member 1 there are two rounded or convexed knobs or lugs 21 and 22 of a conformation to fit the concavity 19, lug 21 being received in the concavity 19 when the thill is in normal position, and lug 22 being received in the concavity when the thill is raised. The side-pieces 15 are provided with concavities 23 which are adapted to receive the bends or humps 9. A detachable plate 24 is secured to coupling member 14 and protects the parts and excludes dirt and dust.

When the thill is in normal position, the engagement of the plunger 18 with the lug 21 holds the thill in that position, the spring 6 also pressing against the side-plate 15 and assisting in preventing rattling. When the thill is raised, the plunger 18 is pressed back by the cam action of the lug 21 thereon and eventually rides past the lug and snaps into engagement with the lug 22, the humps 9 also snapping into the notches 23, thereby securing the thill in raised position. By loosening the screw 20, relieving the tension on spring 6, the thill may be readily detached.

Having thus described my invention, what I claim as new and desire to secure by Letters Patent, is:—

1. In a thill coupling and support, the combination with a coupling member having two separate lugs, of another thill coupling member pivoted to the coupling member first named and carrying a spring-pressed plunger having a concavity adapted to receive the aforesaid lugs to hold the thill in both lowered and raised positions.

2. In a thill coupling and support, the combination with a coupling member, of another coupling member having side-plates straddling the first named coupling member and pivoted thereto and provided with notches, of a fork-shaped leaf-spring the arms of which straddle the first named coupling member and are provided with parts adapted to be received in said notches to hold the thill in raised position.

3. In a thill coupling and support, the combination of coupling members pivoted together, of two independent spring-actuated locking devices for locking the coupling members together at two different points at an angle to each other.

4. In a thill coupling and support, the combination of coupling members pivoted together, of two independent spring-actuated locking devices for locking the coupling members together at two different points at an angle to each other, said locking devices engaging the coupling members on opposite sides of their pivotal connection.

In testimony whereof, I hereunto affix my signature in presence of two witnesses.

WALTER COX.

Witnesses.
 HARVEY CLUFF,
 ALFRED L. BOOTH.